United States Patent
DeCia et al.

(10) Patent No.: US 10,043,326 B2
(45) Date of Patent: Aug. 7, 2018

(54) DRIVER INDENTIFICATION USING VEHICLE APPROACH VECTORS

(71) Applicant: Ford Global Technologies, LLC, Dearborn, MI (US)

(72) Inventors: Nunzio DeCia, Northville, MI (US); Stephen Jay Orris, Jr., New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 15/080,132

(22) Filed: Mar. 24, 2016

(65) Prior Publication Data
US 2017/0278326 A1  Sep. 28, 2017

(51) Int. Cl.
| G07C 9/00 | (2006.01) |
| B60N 2/00 | (2006.01) |
| B60N 2/02 | (2006.01) |
| G01S 1/76 | (2006.01) |

(52) U.S. Cl.
CPC ......... *G07C 9/00031* (2013.01); *B60N 2/002* (2013.01); *B60N 2/0248* (2013.01); *G01S 1/76* (2013.01); *G07C 9/00309* (2013.01); *G07C 2009/00333* (2013.01); *G07C 2009/00801* (2013.01); *G07C 2209/63* (2013.01)

(58) Field of Classification Search
USPC .......... 701/49, 36, 527, 28, 2; 340/5.2, 10.3, 340/10.33, 425.5, 465, 5.8; 702/158
See application file for complete search history.

(56) References Cited

U.S. PATENT DOCUMENTS

| 6,552,649 B1* | 4/2003 | Okada ................. B60R 25/2036 |
| | | 307/10.1 |
| 8,706,350 B2* | 4/2014 | Talty ....................... B60R 25/24 |
| | | 701/36 |
| 8,854,197 B2* | 10/2014 | Ikeda ..................... G08G 1/165 |
| | | 340/425.5 |
| 8,938,332 B1* | 1/2015 | Zhang ................... B60W 10/30 |
| | | 701/36 |

(Continued)

FOREIGN PATENT DOCUMENTS

| FR | 2988344 A1 | 9/2013 |
| GB | 2168893 A | 7/1986 |

(Continued)

OTHER PUBLICATIONS

Search Report dated Aug. 31, 2017, for GB Patent Application No. GB1703912.4 (4 Pages).

*Primary Examiner* — Richard A Goldman
(74) *Attorney, Agent, or Firm* — James P. Muraff; Neal, Gerber & Eisenberg LLP (57) ABSTRACT

Systems and methods for driver identification using vehicle approach vectors are disclosed. An example disclosed vehicle includes a plurality of beacons configured to connect to a first mobile device and a second mobile device. The example vehicle also includes a plurality of ultrasonic sensors. The example vehicle includes a driver identifier configured to predict trajectories for the first and second mobile devices based on information received from the plurality of beacons and the plurality of ultrasonic sensors, and determine which one of the mobile devices is associated with a driver based on the predicted trajectories.

19 Claims, 6 Drawing Sheets

(56) References Cited

U.S. PATENT DOCUMENTS

| | | | |
|---|---|---|---|
| 8,977,408 B1* | 3/2015 | Cazanas | H04L 41/082 455/3.03 |
| 9,171,268 B1* | 10/2015 | Penilla | G06Q 10/02 |
| 9,735,610 B2* | 8/2017 | Colja | H02J 7/025 |
| 2007/0251749 A1 | 11/2007 | Breed et al. | |
| 2010/0304690 A1* | 12/2010 | Proefke | B60R 25/403 455/69 |
| 2012/0040665 A1* | 2/2012 | Liu | H04W 4/008 455/426.1 |
| 2012/0221189 A1* | 8/2012 | Konet | G01C 22/006 701/29.1 |
| 2013/0110318 A1* | 5/2013 | Colja | H02J 7/042 701/2 |
| 2014/0176304 A1* | 6/2014 | Park | G07C 9/00309 340/5.61 |
| 2014/0240091 A1* | 8/2014 | Talty | G07C 9/00309 340/5.62 |
| 2014/0309868 A1* | 10/2014 | Ricci | B60Q 1/00 701/36 |
| 2014/0316660 A1* | 10/2014 | Le | B60N 2/0244 701/49 |
| 2015/0149023 A1* | 5/2015 | Attard | B60W 30/182 701/28 |
| 2015/0310681 A1* | 10/2015 | Avery | G07C 9/00119 340/5.61 |
| 2015/0348178 A1* | 12/2015 | Taylor | G06Q 30/0645 705/307 |
| 2016/0023636 A1* | 1/2016 | Keating | H04W 4/046 701/2 |
| 2017/0120802 A1* | 5/2017 | Decaluwe | B60Q 1/24 |
| 2017/0193823 A1* | 7/2017 | Jiang | G08G 1/127 |
| 2017/0208438 A1* | 7/2017 | Dickow | H04W 4/008 |

FOREIGN PATENT DOCUMENTS

| | | |
|---|---|---|
| JP | 4411783 B2 | 11/2009 |
| WO | WO 0005998 A1 | 2/2000 |
| WO | WO 2014047417 A1 | 3/2014 |

* cited by examiner

DRIVER INDENTIFICATION USING VEHICLE APPROACH VECTORS

TECHNICAL FIELD

The present disclosure generally relates to identifying vehicle occupants and, more specifically, driver identification using vehicle approach vectors.

BACKGROUND

Vehicles are being manufactured that facilitate occupants creating profiles to store vehicle setting preferences, such as the position of the seat, the position of the steering column, configuration of the center console display, etc. Often, key fobs are used to identify a particular driver so the vehicle may customize the vehicle according to that driver's vehicle setting preferences. However, drivers who share vehicles (such as spouses, parents and children, etc.) often share key fobs. In such scenarios, the drivers do not carry their own individual key fobs that provide individual identifying information. To overcome this, some vehicles identify the driver while the driver is in the vehicle, or require an affirmative action to identify him/her before the driver enters the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments providing systems and methods for driver identification using vehicle approach vectors are disclosed. An example disclosed vehicle includes a plurality of beacons configured to connect to a first mobile device and a second mobile device. The example vehicle also includes a plurality of ultrasonic sensors. The example vehicle includes a driver identifier configured to predict trajectories for the first and second mobile devices based on information received from the plurality of beacons and the plurality of ultrasonic sensors, and determine which one of the mobile devices is associated with a driver based on the predicted trajectories.

An example method to identify a driver is disclosed. The example method includes connecting, via a plurality of beacons, to a first mobile device and a second mobile device. The example method also includes monitoring, via a plurality of ultrasonic sensors, a plurality of zones around the vehicle. Additionally, the example method includes predicting trajectories for the first and second mobile devices based on information received from the plurality of beacons and the plurality of ultrasonic sensors. The example method includes determining which one of the mobile devices is associated with the driver based on the predicted trajectories.

An example tangible computer readable medium comprising instructions is disclosed. The example instructions, when executed, cause a vehicle to connect, via a plurality of beacons, to a first mobile device and a second mobile device. The example instructions cause the vehicle to monitor, via a plurality of ultrasonic sensors, a plurality of zones around the vehicle. Additionally, the example instructions cause the vehicle to predict trajectories for the first and second mobile devices based on information received from the plurality of beacons and the plurality of ultrasonic sensors. The example instructions cause the vehicle to determine which one of the mobile devices is associated with the driver based on the predicted trajectories.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Because drivers of a vehicle often share a key fob, a secondary method of identification is deployed. Mobile devices (such as smart phones, tablets, etc.) of people associated with the vehicle (e.g., drivers, passengers, etc.) are paired to the vehicle via a wireless connection (e.g., a Bluetooth® connection, wireless local area network, etc.). This facilitates the mobile devices interacting with the vehicle. For example, music or podcasts may be played on a sound system of the vehicle; telephone calls may be routed through a microphone and speakers of the vehicle, etc. As discussed herein below, the wireless connection is used to identify when people associated with the mobile devices are within range of the vehicle. To facilitate identifying the people, beacons based on Bluetooth Low Energy (BLE) are installed around the vehicle. Based on received signal strength indication (RSSI) and/or received transmission strength (RX) between the beacons and the mobile device(s), the location of the mobile device(s) is/are is estimated via trilateration. As used herein, the terms "trilaterate" and "trilateration" are defined as the process of determining locations of points (e.g., the mobile devices, etc.) by measurement of distances, using the geometry of circles, spheres or triangles. In such a manner, the identities and the approximate location of people associated with the vehicle are tracked. The person whose trajectory is predicted to go to the driver's side door is predicted to be the driver.

However, in some environments, interference can cause errors which affect prediction of the trajectory of the mobile devices (and thus the associated person). For example, signal reflections off of nearby vehicles or obstructions in the path between the mobile device and some of the beacons can cause a disproportionate drop reflected in the RSSI/RX. As disclosed herein below, the vehicle uses range detection sensors, such as ultrasonic sensors, to confirm the approach vector of the people associated with the mobile devices. The range detection sensors are correlated to the readings of the beacons to account for situations where disproportionate drops in RSSI/RX caused by environmental factors would otherwise lead to incorrect proximity calculations. The vehicle uses the estimated locations from the beacons and objects detected by the range detection sensors to predict the vehicle approach trajectories of the people associated with the mobile devices. The vehicle predicts the identity of the driver based on the predicted vehicle approach trajectories.

FIGS. 1A through 1D illustrate identifying a driver using vehicle approach vectors in accordance with the teachings of this disclosure. In the illustrated examples, a vehicle 100 includes a passive key fob scanner 102, beacons 104, range detection sensors 106, and a driver identifier 108. The vehicle 100 may be a standard gasoline powered vehicle, a hybrid vehicle, an electric vehicle, a fuel cell vehicle, or any other mobility implement type of vehicle. The vehicle 100 may be non-autonomous or semi-autonomous. The vehicle 100 includes parts related to mobility, such as a powertrain with an engine, a transmission, a suspension, a driveshaft, and/or wheels, etc.

The passive key fob scanner 102 detects when a key fob 110 associated with the vehicle 100 is within a radius 112 of the vehicle 100. In some examples, the radius 112 is three meters (9.84 feet). The passive key fob scanner 102 generates a low power, low frequency signal that is detected by the key fob 110. The key fob 110 responds to the signal to establish that it is the key fob 110 paired with (e.g., is authorized to access) the vehicle 100. Initially, to conserve power, the beacons 104 and the range detection sensors 106 are not activated. In response to detecting the key fob 110 inside the radius 112, the driver identifier 108 activates the beacons 104 and the range detection sensors 106.

The beacons 104 are positioned around the vehicle 100. In the illustrated examples, the beacons 104 are installed near a driver's side front door 114, a driver's side rear door 116, a passenger's side front door 118, and a passenger's side rear door 120. When activated, the beacons 104 establish connections with mobile devices 122 and 124 (e.g., smart phones, feature phones, tablets, etc.) that have been paired to the beacons 104. The mobile devices 122 and 124 may be paired with the beacons 104 during a setup process via an infotainment head unit (e.g., the infotainment head unit 204 of FIG. 2 below). The example beacons 104 implement Bluetooth Low Energy (BLE). The BLE protocol is set forth in Volume 6 of the Bluetooth Specification 4.0 (and subsequent revisions) maintained by the Bluetooth Special Interest Group.

Messages exchanged between the mobile device(s) 122 and 124 and the beacons 104 include the RSSI and/or the RX values between the mobile device(s) 122 and 124 and the beacons 104. The RSSI and RX values measure the open-path signal strength that the mobile device 122 and 124 detects from the corresponding beacon 104. The RSSI is measured in signal strength percentage, the values (e.g., 0-100, 0-137, etc.) of which are defined by a manufacturer of hardware used to implement the beacons 104. Generally, a higher RSSI means that the mobile device 122 and 124 is closer to the corresponding beacon 104. The RX values are measured in Decibel-milliWatts (dBm). For example, when the mobile device 122 and 124 is one meter (3.28 feet) away, the RX value may be −60 dBm, and when the mobile device is two meters (6.56 feet) away, the RX value may be −66 dBm. The RSSI/RX values are used to determine the distance from the mobile device 122 and 124 to the particular beacon 104.

The range detection sensors 106 are mounted to a front bumper and a rear bumper of the vehicle 100 to detect objects within a set range along a front arc and/or a rear arc of the vehicle 100. In some examples, the range detection sensors 106 are ultrasonic sensors that use high frequency sound waves. In the illustrated example, the range detection sensors 106 detect objects within zones A-F and H-M. For example, one of the range detection sensors 106 may be configured to detect objects within Zone C.

The driver identifier 108 predicts the trajectory of a driver based on the RSSI/RX values from the beacons 104 and the object detection of the range detection sensors 106. In some examples, the driver identifier 108 is in low power mode until receiving a signal from the passive key fob scanner 102. From time to time (e.g., every two seconds, every three seconds, etc.), the driver identifier 108 estimates location(s) 126 and 128 of mobile devices 122. The driver identifier 108 estimates the location(s) 126 and 128 of the mobile device(s) 122 and 124 based on the RSSI/RX values corresponding to the mobile device(s) 122 received from the beacons 104. When one of the estimated locations 126 and 128 is within or near one of the Zones A-F or H-M, the driver identifier 108 determines whether the corresponding range detection sensor(s) 106 detect(s) an object. For example, if the estimated location 126 and 128 is in Zone D, the driver identifier 108 determines whether the range detection sensor 106 associated with Zone D detects an object. In some examples, the driver identifier 108 also determines whether ones of the range detection sensors 106 corresponding to an adjacent zone detect an object. For example, if the estimated location 126 and 128 is in Zone C, the driver identifier 108 determines whether the range detection sensors 106 associated with Zone B, Zone C, or Zone D detect an object. If one of the range detection sensors 106 detects an object that corresponds to the one of the estimated locations 126 and 128, the driver identifier 108 corrects that estimated location 126 and 128 to the location of the object detected by the range detection sensors 106.

For each of the detected mobile devices 122 and 124, the driver identifier 108 calculates an approach vector based on consecutive estimated locations 126 and 128. The approach vectors specify a direction and a speed for the corresponding mobile device 122 and 124. The driver identifier 108 uses the approach vector(s) to predict which door 114, 116, 118, and 120 the mobile device(s) 122 is/are moving towards. The driver identifier 108 updates the approach vectors and the predicted trajectories when new locations 126 and 128 are estimated.

In some examples, the driver identifier 108 includes a learning algorithm which uses contextual data (e.g., time of day, day of week, vehicle location, etc.) to augment the prediction of the trajectory of a potential driver. For example, if one of the mobile devices 122 and 124 predominantly approaches the driver's side front door 114 on weekday mornings, then the driver identifier 108 may initially predict that the person associated that mobile device 122 and 124 will have a trajectory towards the driver's side front door 114 until the approach vectors override the presumption.

Figure 1A:
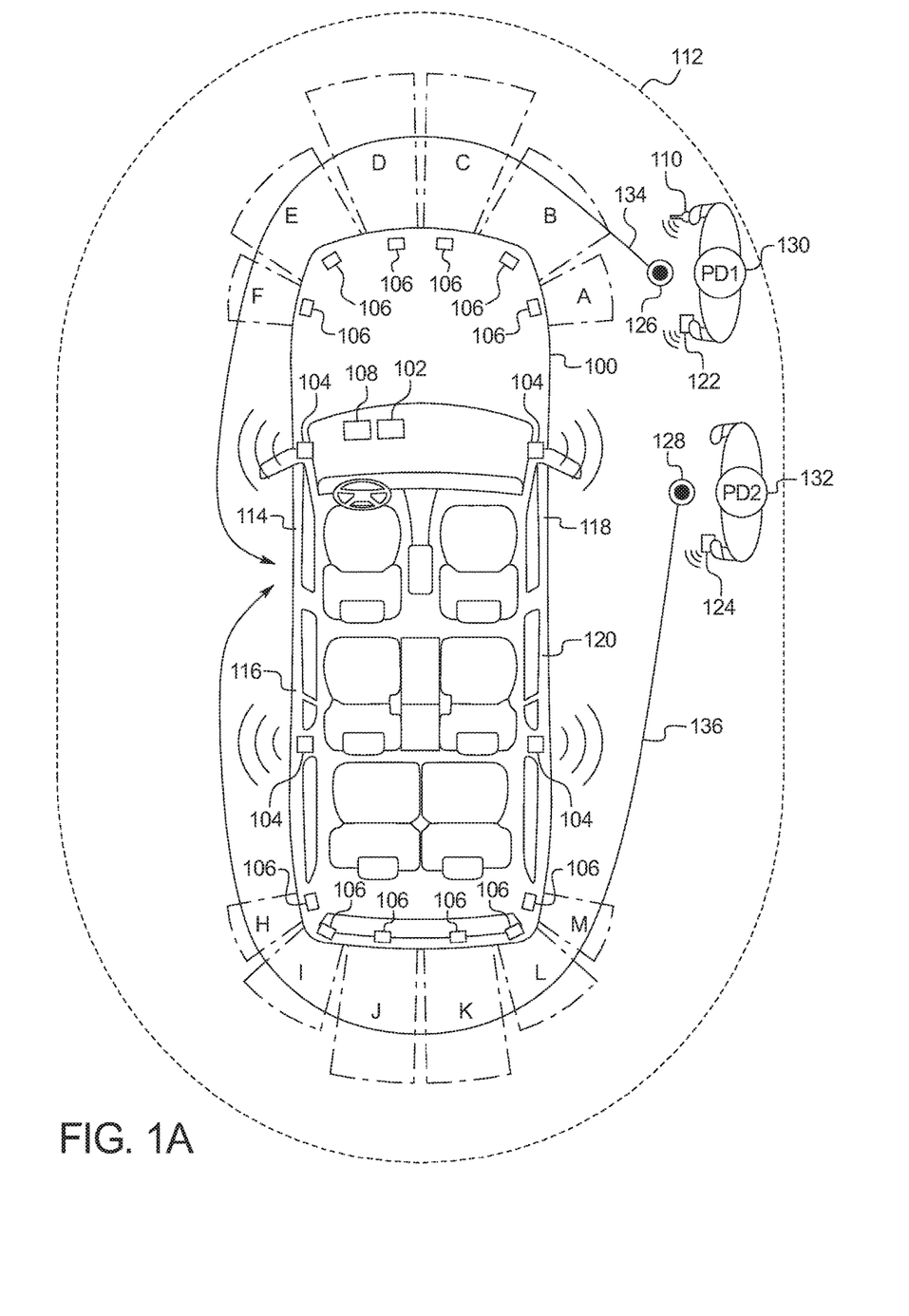
FIGS. 1A through 1D illustrate identifying a driver using vehicle approach vectors in accordance with the teachings of this disclosure.

FIG. 1A illustrates an example of a first potential driver 130 holding the key fob 110 and the first mobile device 122, and a second potential driver 132 holding the second mobile device 124 at a first time. In the illustrated example, the driver identifier 108 detects the key fob 110 and activates the beacons 104 and the range detection sensors 106. The driver identifier 108 estimates the first location 126 based on RSSI/RX values between the beacons 104 and the first mobile device 122. The driver identifier 108 estimates the second location 128 based on RSSI/RX values between the beacons 104 and the second mobile device 124. Based on the first estimated location 126, the driver identifier 108 predicts a first trajectory 134 for the first potential driver 130. Based on the second estimated location 128, the driver identifier 108 predicts a second trajectory 136 for the second potential driver 132. In the illustrated example of FIG. 1A, at the first time, the driver identifier 108 does not select which one of the potential drivers 130 and 132 is the actual driver.

Figure 1B:
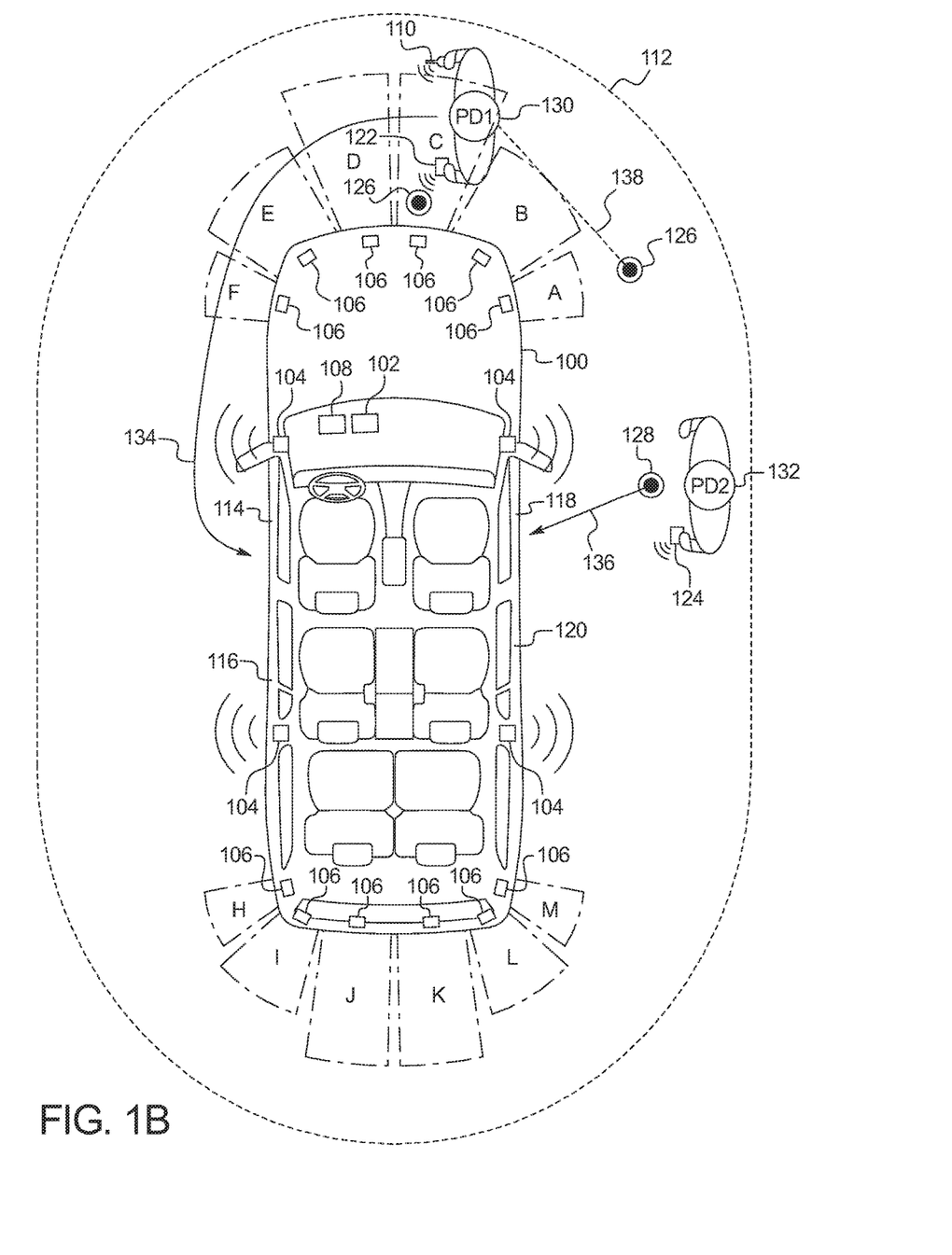

FIG. 1B illustrates an example of the first potential driver 130 and the second potential driver 132 at a second time after the first time illustrated in FIG. 1A. In the illustrated example, the driver identifier 108 updates the first estimated location 126 based on the RSSI/RX values between the beacons 104 and the first mobile device 122. Because the first estimated location 126 is in one of zones (e.g., Zone C), the driver identifier 108 calculates a first approach vector 138 based on the first estimated location 126 at the first time and the location of the object (e.g., the first potential driver 130) detected by the range detection sensors 106 at the second time.

The driver identifier 108 updates the second estimated location 128 based on the RSSI/RX values between the beacons 104 and the second mobile device 124. In the illustrated example, because the first approach vector 138 confirmed the first trajectory 134 predicted at the first time, the driver identifier 108 predicts a different path for the second trajectory 136. In some examples, the driver identifier 108 selects the first potential driver 130 as the actual driver. In some such examples, the driver identifier 108 may cause the interior preference settings of the vehicle 100 to be set according to a profile associated with the first potential driver 130. Alternatively, in some examples, the driver identifier 108 may wait until the first predicted trajectory 134 is confirmed a second time before selecting the first potential driver 130 as the actual driver.

Figure 1C:
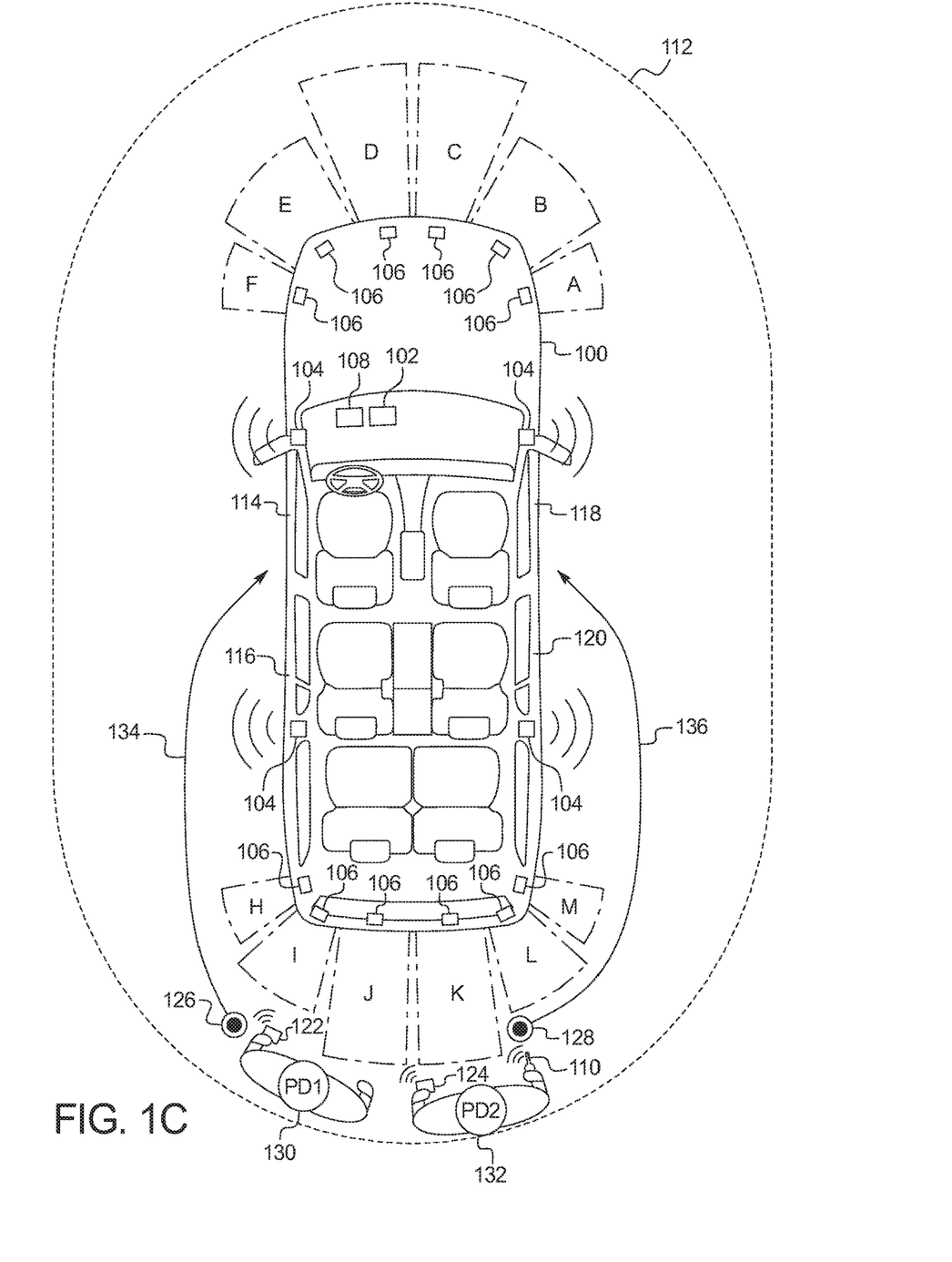

FIG. 1C illustrates an example of the first potential driver 130 holding the first mobile device 122, and the second potential driver 132 holding the key fob 110 and the second mobile device 124 at a first time. In the illustrated example, the driver identifier 108 detects the key fob 110 and activates the beacons 104 and the range detection sensors 106. The driver identifier 108 estimates the first location 126 based on RSSI/RX values between the beacons 104 and the first mobile device 122. The driver identifier 108 estimates the second location 128 based on RSSI/RX values between the beacons 104 and the second mobile device 124. Based on the first estimated location 126, the driver identifier 108 predicts a first trajectory 134 for the first potential driver 130. Based on the second estimated location 128, the driver identifier 108 predicts a second trajectory 136 for the second potential driver 132.

Figure 1D:
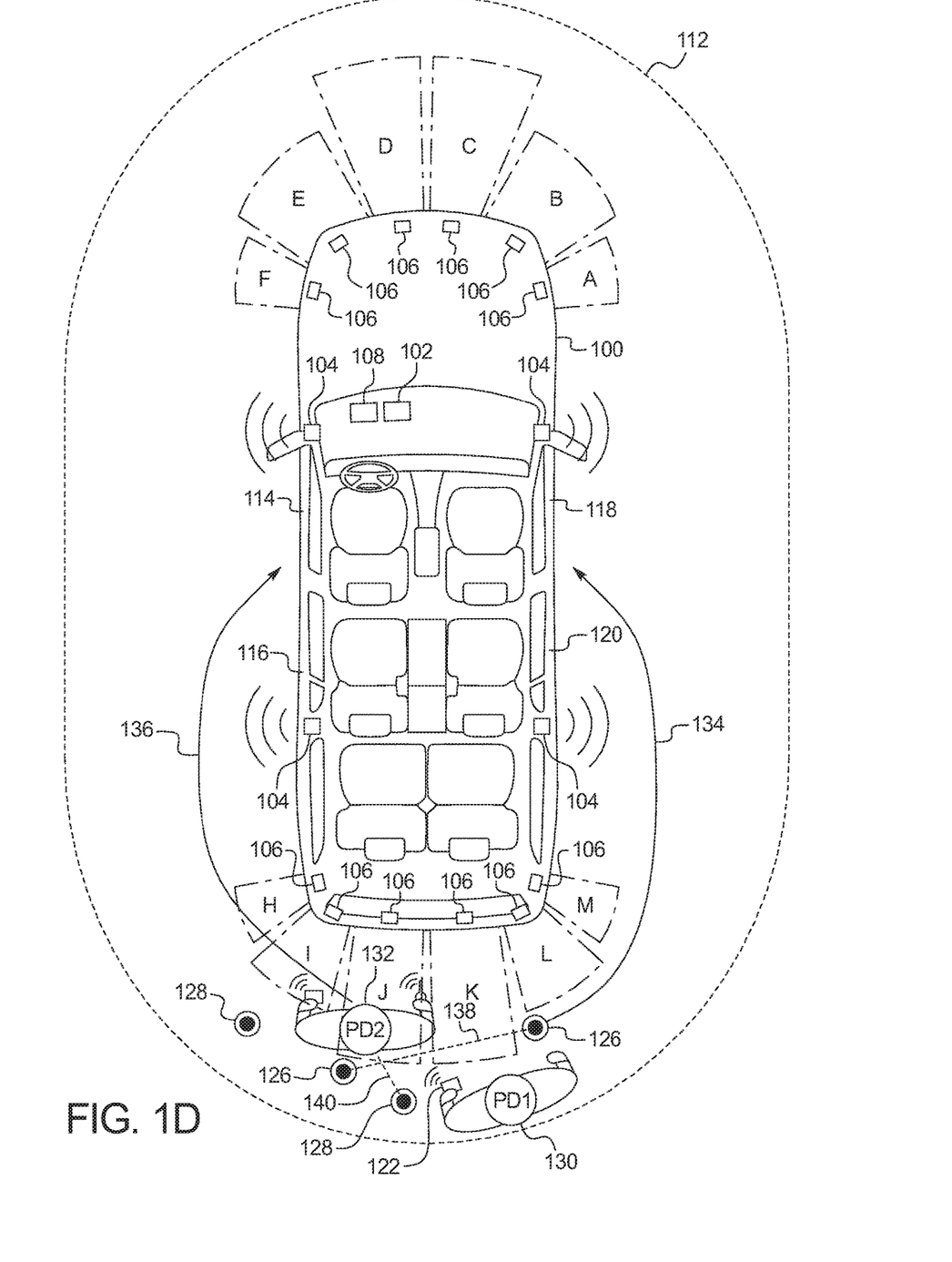

FIG. 1D illustrates an example of the first potential driver 130 and the second potential driver 132 at a second time after the first time illustrated in FIG. 1C. In the illustrated example, the driver identifier 108 updates the first estimated location 126 based on the RSSI/RX values between the beacons 104 and the first mobile device 122. Because the first estimated location 126 is near one of zones (e.g., Zone L), the driver identifier 108 determines whether the range detection sensors 106 associated with the adjacent zones (e.g., Zones K, L and M) detect an object. The driver identifier 108 calculates the first approach vector 138 based on the first estimated location 126 at the first time and the first estimated location 126 at the second time. Based on the first approach vector 138, the driver identifier 108 predicts the first trajectory 134.

The driver identifier 108 updates the second estimated location 128 based on the RSSI/RX values between the beacons 104 and the second mobile device 124. Because the second estimated location 128 is near one of zones (e.g., Zone I), determines whether the range detection sensors 106 associated with the adjacent zones (e.g., Zones H, I and J) detect an object. The driver identifier 108 calculates a second approach vector 140 based on the second estimated location 128 at the first time and the location of the object (e.g., the second potential driver 132) detected by the range detection sensors 106. Based on the second approach vector 140, the driver identifier 108 predicts the second trajectory 136.

Figure 2:
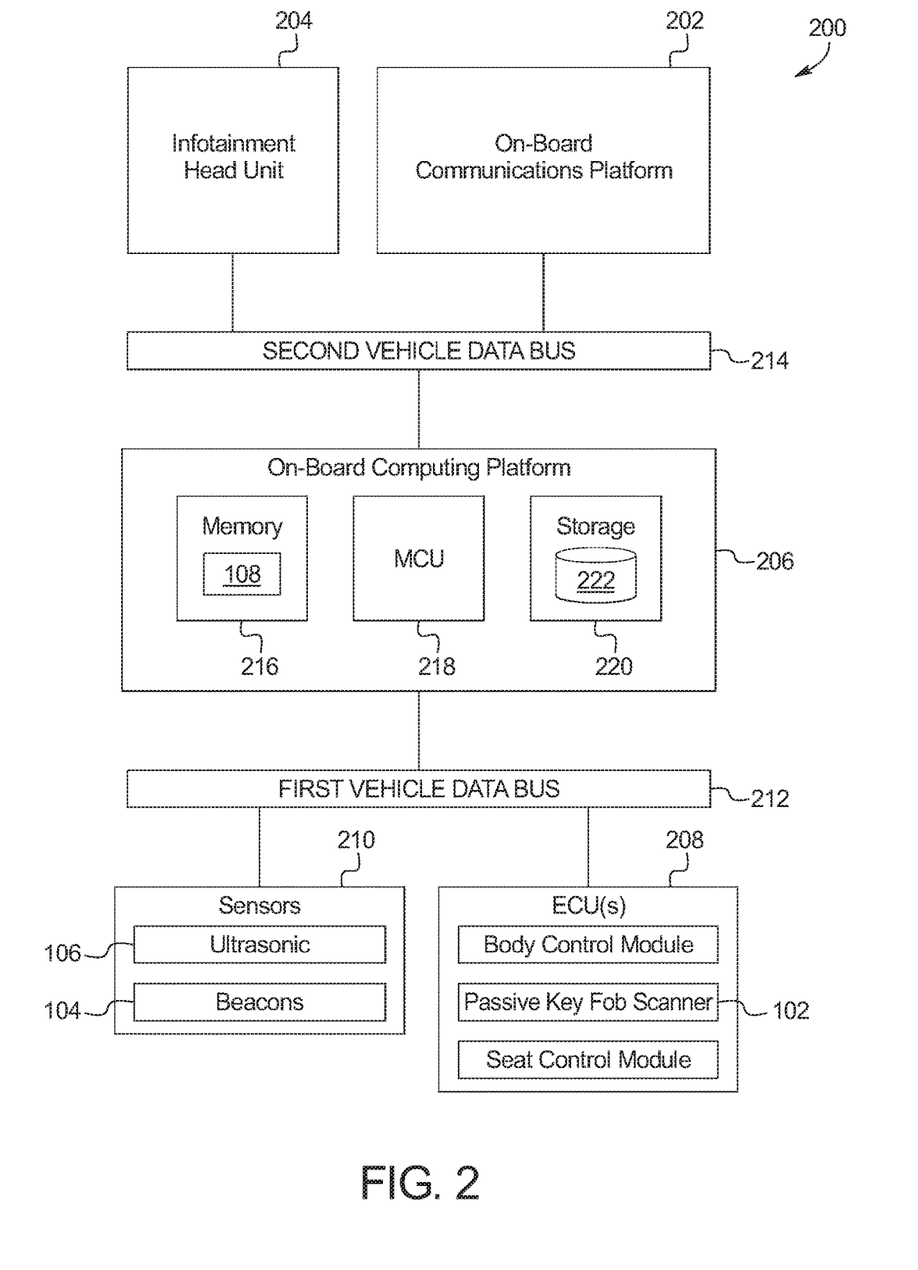
FIG. 2 is a block diagram illustrating example electronic components of a vehicle of FIG. 1.

FIG. 2 is a block diagram illustrating example electronic components 200 of a vehicle 100 of FIG. 1 The electronic components 200 include an example on-board communications platform 202, an example infotainment head unit 204, an on-board computing platform 206, example electronic control units (ECUs) 208, sensors 210, a first vehicle data bus 212, and a second vehicle data bus 214.

The on-board communications platform 202 includes wired or wireless network interfaces to enable communication with external networks. The on-board communications platform 202 also includes hardware (e.g., processors, memory, storage, antenna, etc.) and software to control the wired or wireless network interfaces. The on-board communications platform 202 includes controllers for Bluetooth® and/or other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11 ad), etc.). The on-board communications platform 202 may also include a global positioning system (GPS) receiver. Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 202 may also include a wired or wireless interface to enable direct communication with an electronic device (such as, a smart phone, a tablet computer, a laptop, etc.).

The infotainment head unit 204 provides an interface between the vehicle 100 and a user (e.g., a driver, a passenger, etc.). The infotainment head unit 204 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers.

The on-board computing platform 206 includes a processor or controller 216, memory 218, and storage 220. The on-board computing platform 206 is structured to include the driver identifier 108. The processor or controller 216 may be any suitable processing device or set of processing devices such as, but not limited to: a microprocessor, a microcontroller-based platform, a suitable integrated circuit, one or more field programmable gate arrays (FPGAs), or one or more application-specific integrated circuits (ASICs). The memory 218 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 218 includes multiple kinds of memory, particularly volatile memory and non-volatile memory. The storage 220 may include any high-capacity storage device, such as a hard drive, and/or a solid state drive.

The memory 218 and the storage 220 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 218, the computer readable medium, and/or within the controller 216 during execution of the instructions.

In the illustrated example, the storage 220 includes a driver profile database 222. The driver profile database 222 includes interior preference settings of the drivers (e.g., the potential drivers 130 and 132 of FIGS. 1A-1D) of the vehicle 100. The interior preference settings include a driver seat position, a steering column position, a pedal position, radio presets and/or HVAC settings, etc.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 210 may be arranged in and around the vehicle 100 in any suitable fashion. In the illustrated example, the sensors include the beacons 104 and the range detection sensors 106. In the illustrated example, the beacons 104 are proximate the doors 114, 116, 118 and 120. The range detection sensors 106 may be ultrasonic sensors and/or RADAR sensors that are arranged on the bumpers of the vehicle 100.

The ECUs 208 monitor and control the systems of the vehicle 100. The ECUs 208 communicate and exchange information via the first vehicle data bus 212. Additionally, the ECU(s) 208 may communicate properties (such as, status of the ECU 208, sensor readings, control state, error and diagnostic codes, etc.) to and/or receive commands from the on-board computing platform 206. Some vehicles 100 may have seventy or more ECUs 208 located in various locations around the vehicle 100 communicatively coupled by the first vehicle data bus 212. The ECUs 208 are discrete sets of electronics that include their own circuit(s) (such as integrated circuits, microprocessors, memory, storage, etc.) and firmware, sensors, actuators, and/or mounting hardware. In the illustrated example, the ECUs 208 include the passive key fob scanner 102, a body control module to control vehicle subsystems such as power door locks, and a seat control module to control the position of the seat.

The first vehicle data bus 212 communicatively couples the ECUs 208, the sensors, and the on-board computing platform 206. In some examples, the first vehicle data bus 212 is a controller area network (CAN) bus protocol as defined by International Standards Organization (ISO) 11898-1. Alternately, in some examples, the first vehicle data bus 212 may be a Media Oriented Systems Transport (MOST) bus, an Ethernet bus, or a controller area network flexible data (CAN-FD) bus (ISO 11898-7). The second vehicle data bus 214 communicatively couples the on-board communications platform 202, the infotainment head unit 204, and the on-board computing platform 206. The second vehicle data bus 214 may be an Ethernet bus a CAN-FD bus, or a MOST bus, etc. In some examples, the on-board computing platform 206 communicatively isolates the second vehicle data bus 214 and the first vehicle data bus 212 (e.g., via firewalls, message brokers, etc.). Alternatively, in some examples, the first vehicle data bus 212 and the second vehicle data bus 214 are the same data bus.

Figure 3:
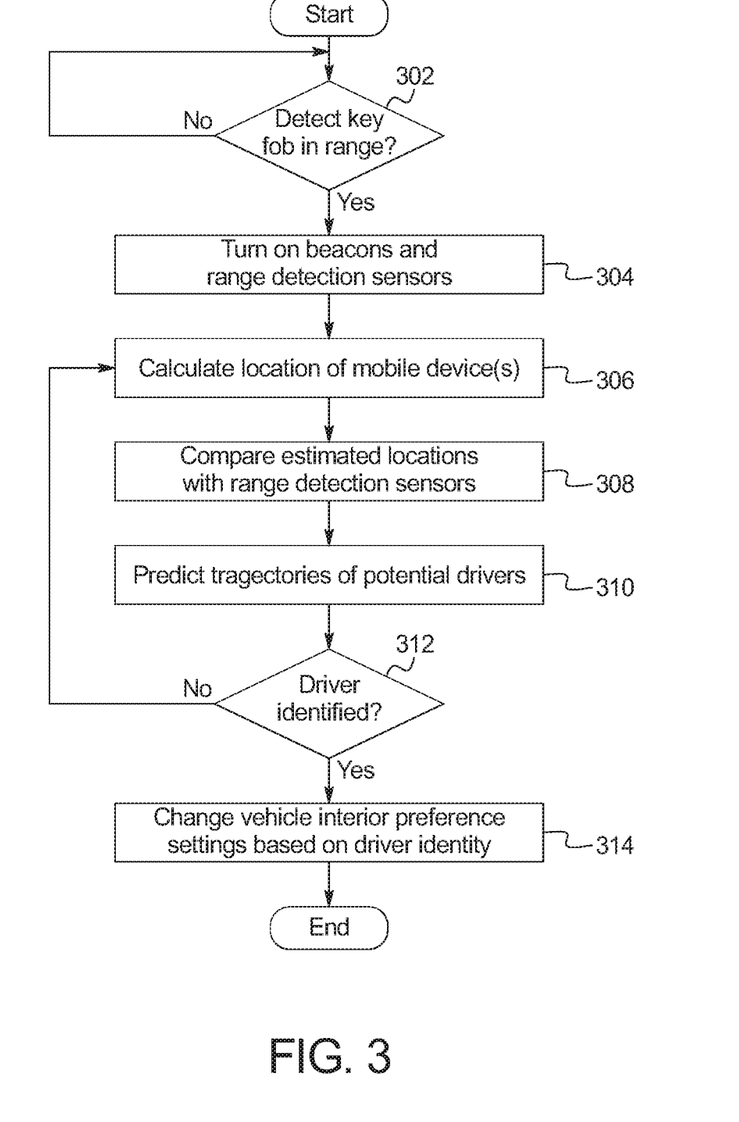
FIG. 3 is a flowchart of an example method to identify a driver using vehicle approach vectors that may be implemented by the electronic components of FIG. 2.

FIG. 3 is a flowchart of an example method to identify a driver using vehicle approach vectors that may be implemented by the electronic components 200 of FIG. 2. Initially, the driver identifier 108, via the passive key fob scanner 102, detects when the key fob 110 is within range (e.g., inside the radius 112 (block 302). In response to detecting the key fob 110, the driver identifier 108 activates the beacons 104 and the range detection sensors 106 (block 304). Using RSSI/RX values received from the beacons 104, the driver identifier 108 calculates the location(s) 126 and 128 of the mobile device(s) 122 and 124 (block 306) using trilateration. The driver identifier 108 compares the location(s) 126 and 128 estimated at block 306 to readings from the range detection sensors 106 (block 308).

The driver identifier 108 then predicts the trajectories 134 and 136 of the potential drivers 130 and 132 (block 310). The driver identifier 108 predicts the trajectories 134 and 136 based on the approach vectors 138 and 140 calculated from changes in the estimated location(s) 126 and 128 and the readings from the range detection sensors 106 received over a period of time. For example, the first estimated location 126 at the first time and the first estimated location 126 at the second time form the approach vector (e.g., a direction of movement and a speed, etc.) for the potential driver 130 associated with the first estimated location 126 relative to the vehicle 100. In some examples, the driver identifier 108 predicts the trajectories 134 and 136 to one of the doors 114, 116, 118, and 120 using the approach vectors.

The driver identifier 108 determines whether one of the potential drivers 130 and 132 can be identified as the actual driver based on the trajectories predicted at block 308 (block 312). For example, the driver identifier 108 may determine that one of the potential drivers 130 and 132 can be identified as the actual driver when only one of the predicted trajectories 134 and 136 is projected to be heading to the driver's side front door and that is confirmed by a subsequent trajectory prediction. If the driver identifier 108 identifies one of the potential drivers 130 and 132 as the actual driver, the driver identifier 108 causes the interior preferences to be set (e.g., via the seat control module, the infotainment head unit 204, etc.) according to the profile of the identified actual driver (block 314). Otherwise, if the driver identifier 108 does not identify one of the potential drivers 130 and 132 as the actual driver, the driver identifier 108 continues to monitor the location(s) 126 and 128 of the mobile devices 122 and 124 (block 306).

The flowchart of FIG. 3 is representative of machine readable instructions that comprise one or more programs that, when executed by a processor (such as the processor 216 of FIG. 2), cause the vehicle 100 to implement the driver identifier 108 of FIGS. 1A-1D. Further, although the example programs are described with reference to the flowchart illustrated in FIG. 3, many other methods of implementing the example driver identifier 108 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a plurality of beacons configured to connect to a first mobile device and a second mobile device;
a plurality of ultrasonic sensors; and
a driver identifier configured to:
predict trajectories for the first and second mobile devices based on information received from the plurality of beacons and the plurality of ultrasonic sensors; and
determine which one of the mobile devices is associated with a driver based on the predicted trajectories.

2. The vehicle of claim 1, including a key scanner configured to activate the plurality of beacons and the plurality of ultrasonic sensors in response to detecting a key fob authorized to access the vehicle.

3. The vehicle of claim 1, wherein information received from each of the plurality of beacons includes at least one of a received signal strength indication or a received transmission strength value; and wherein the information received from each of the plurality of ultrasonic sensors includes whether an object is within a zone monitored by the ultrasonic sensor.

4. The vehicle of claim 3, wherein the driver identifier is configured to:
based on the information received from each of the plurality of beacons at a first time, calculate a first location of the first mobile device and a second location of the second mobile device; and
based on the information received from each of the plurality of beacons at a second time after the first time, calculate a third location of the first mobile device and a fourth location of the second mobile device at a second time after the first time.

5. The vehicle of claim 4, wherein the driver identifier is configured to correct at least one of the first location, the second location, the third location, or the fourth location based on the information received from the plurality of ultrasonic sensors.

6. The vehicle of claim 4, wherein the driver identifier is configured to:
calculate a first approach vector for the first mobile device based on the first location and the third location; and
calculate a second approach vector for the second mobile device based on the second location and the fourth location.

7. The vehicle of claim 6, wherein the trajectories for the first and second mobile devices predicted by the driver identifier are based on the first approach vector and the second approach vector respectively.

8. The vehicle of claim 1, wherein the predicted trajectories define paths from the first and second mobile devices to doors of the vehicle.

9. The vehicle of claim 1, including a seat control module to adjust a position of a driver seat based on a profile associated with the driver.

10. A method to identify a driver, the method comprising:
connecting, via a plurality of beacons, to a first mobile device and a second mobile device;
monitoring, via a plurality of ultrasonic sensors, a plurality of zones around a vehicle;
predicting, via a processor, trajectories for the first and second mobile devices based on information received from the plurality of beacons and the plurality of ultrasonic sensors; and
determining, via the processor, which one of the mobile devices is associated with the driver based on the predicted trajectories.

11. The method of claim 10, including activating the plurality of beacons and the plurality of ultrasonic sensors in response to a key scanner detecting a key fob authorized to access the vehicle.

12. The method of claim 10, wherein information received from each of the plurality of beacons includes at least one of a received signal strength indication or a received transmission strength value; and wherein the information received from each of the plurality of ultrasonic sensors includes whether an object is within the zone monitored by the ultrasonic sensor.

13. The method of claim 12, including:
based on the information received from each of the plurality of beacons at a first time, calculating a first location of the first mobile device and a second location of the second mobile device; and
based on the information received from each of the plurality of beacons at a second time after the first time, calculating a third location of the first mobile device and a fourth location of the second mobile device at a second time after the first time.

14. The method of claim 13, including correcting at least one of the first location, the second location, the third location, or the fourth location based on the information received from the plurality of ultrasonic sensors.

15. The method of claim 13, including:
calculating a first approach vector for the first mobile device based on the first location and the third location; and
calculating a second approach vector for the second mobile device based on the second location and the fourth location.

16. The method of claim 15, wherein the trajectories for the first and second mobile devices predicted by the driver identifier are based on the first approach vector and the second approach vector respectively.

17. The method of claim 10, wherein the predicted trajectories define paths from the first and second mobile devices to doors of the vehicle.

18. The method of claim 10, including adjusting, via a seat control module, a position of a driver seat based on a profile associated with the driver.

19. A non-transitory computer readable medium comprising instructions that, when executed, cause a vehicle to:
connect, via a plurality of beacons, to a first mobile device and a second mobile device;
monitor, via a plurality of ultrasonic sensors, a plurality of zones around the vehicle; and
predict trajectories for the first and second mobile devices based on information received from the plurality of beacons and the plurality of ultrasonic sensors; and
determine which one of the mobile devices is associated with the driver based on the predicted trajectories.

* * * * *

UNITED STATES PATENT AND TRADEMARK OFFICE
CERTIFICATE OF CORRECTION

PATENT NO.         : 10,043,326 B2
APPLICATION NO.    : 15/080132
DATED              : August 7, 2018
INVENTOR(S)        : DeCia et al.

Page 1 of 1

It is certified that error appears in the above-identified patent and that said Letters Patent is hereby corrected as shown below:

On the Title Page

Item [54], delete "DRIVER INDENTIFICATION USING VEHICLE APPROACH VECTORS", insert --DRIVER IDENTIFICATION USING VEHICLE APPROACH VECTORS--.

Signed and Sealed this
Second Day of October, 2018

Andrei Iancu
*Director of the United States Patent and Trademark Office*